(12) United States Patent  (10) Patent No.: US 7,507,037 B2
Yang et al.  (45) Date of Patent: Mar. 24, 2009

(54) OPTICAL TRANSCEIVER HAVING IMPROVED UNLOCKING MECHANISM

(75) Inventors: Zhong Yang, Chengdu Sichuan Province (CN); Zili Wang, Chengdu Sichuan Province (CN); Linhua Zhang, Chengdu Sichuan Province (CN); Dongsheng Li, Chengdu Sichuan Province (CN)

(73) Assignee: Fiberxon, Inc., Santa Clara, CA (US)

( * ) Notice: Subject to any disclaimer, the term of this patent is extended or adjusted under 35 U.S.C. 154(b) by 39 days.

(21) Appl. No.: 11/563,212

(22) Filed: Nov. 27, 2006

(65) Prior Publication Data

US 2008/0124088 A1 May 29, 2008

(51) Int. Cl.
   *G02B 6/36* (2006.01)
(52) U.S. Cl. .......................................... 385/92; 385/53
(58) Field of Classification Search ................ 385/92
   See application file for complete search history.

(56) References Cited

U.S. PATENT DOCUMENTS

| | | | |
|---|---|---|---|
| 5,588,080 A | 12/1996 | Kawamura | |
| 6,371,663 B1 | 4/2002 | Kneier | |
| 6,430,053 B1 | 8/2002 | Peterson | |
| 6,612,858 B1 * | 9/2003 | Stockhaus | 439/352 |
| 6,687,635 B2 | 2/2004 | Horne | |
| 6,700,654 B2 | 3/2004 | Gerrish | |
| 6,741,622 B2 | 5/2004 | Otsuka | |
| 6,801,454 B2 | 10/2004 | Wang | |
| 6,809,300 B2 | 10/2004 | Wakui | |
| 7,194,178 B2 * | 3/2007 | Nakano | 385/134 |
| 2002/0093796 A1 | 7/2002 | Medina | |
| 2003/0027440 A1 | 2/2003 | Birch | |
| 2003/0044121 A1 | 3/2003 | Shang | |
| 2003/0049000 A1 | 3/2003 | Wu | |
| 2003/0053762 A1 | 3/2003 | Cheng | |
| 2003/0072137 A1 | 4/2003 | Yen | |
| 2003/0072540 A1 | 4/2003 | Huang | |
| 2003/0156801 A1 | 8/2003 | Hwang | |
| 2003/0194190 A1 | 10/2003 | Huang | |
| 2003/0206403 A1 | 11/2003 | Zaremba | |
| 2003/0214789 A1 | 11/2003 | Medina | |
| 2004/0008954 A1 | 1/2004 | Shaw | |
| 2004/0029417 A1 | 2/2004 | Engel | |
| 2004/0101265 A1 * | 5/2004 | Jong et al. | 385/134 |
| 2004/0161207 A1 | 8/2004 | Chiu | |
| 2005/0157987 A1 * | 7/2005 | Dodds et al. | 385/92 |
| 2006/0078259 A1 * | 4/2006 | Fuchs | 385/88 |

FOREIGN PATENT DOCUMENTS

EP   1067662   10/2001

* cited by examiner

*Primary Examiner*—Sung H Pak
(74) *Attorney, Agent, or Firm*—Fish & Richardson P.C.

(57) ABSTRACT

An optical transceiver system includes an optical transceiver module configured to be locked to cage in a host electronic equipment and a key configured to remove the optical transceiver module from the cage, wherein the key comprises two fingers configured to be inserted into the cage and unlock optical transceiver module from the cage.

17 Claims, 5 Drawing Sheets

OPTICAL TRANSCEIVER HAVING IMPROVED UNLOCKING MECHANISM

TECHNICAL FIELD

This disclosure relates to optical transceiver modules.

RELATED PATENT APPLICATIONS

The present patent application is related to commonly assigned and concurrently filed US design patent application, entitled "REMOVABLE KEY FOR OPTICAL TRANSCEIVER", the disclosure of which is incorporated herein by reference.

BACKGROUND

Fiber optic lines have been increasingly used to handle the increased data transmission volume over the data network. Fiber optic lines and the associated fiber optic signals typically require transceivers to convert optical light pulse signals to electronic signals that can be processed by computers. Modern optical transceivers have been modularized with standard physical sizes, and optical and electrical interfaces, which are specified by various agreements. One such standard agreement is 10 Gigabit Small Form Factor Pluggable modules (XFP). An XFP transceiver module refers to an optical transceiver that complies with XFP specifications such as outer envelope size, internal electrical specifications, optical connector ports, and electrical interface.

A conventional optical transceiver can include a built-in unlocking mechanism to allow the optical transceiver to be un-locked and unplugged from a cage in the host equipment the optical transceiver is connected to. For example, referring to FIG. 1, a conventional optical transceiver module 100, which may be compatible with XFP standard, can include a base portion 110, a cover 120, an optical interface 130, an electrical interface 140, with edge connectors, a locking gap 160, an unlocking lever 180, and a pair of unlocking fingers 190. The unlocking lever 180 can be lifted outward from the optical transceiver module 100, which causes the unlocking fingers 190 to move inward to push the locking tabs of the cage that the optical transceiver module 100 resides in, thus unlocking the optical transceiver module 100 from the cage. A disadvantage of the conventional optical transceiver module 100 is that it does not provide security. The optical transceiver module transceiver can be unplugged from the cage during operations.

SUMMARY

In a general aspect, the present invention relates to an optical transceiver system including an optical transceiver module that can be locked to cage in a host electronic equipment and a key configured to remove the optical transceiver module from the cage, wherein the key includes two fingers configured to be inserted into the cage and unlock optical transceiver module from the cage.

In another general aspect, the present invention relates to a removable key for an optical transceiver module including two fingers configured to be inserted into a cage in which the optical transceiver module is plugged, wherein the two fingers are configured to unlock optical transceiver module from the cage; and a locking mechanism to allow the key to be locked to the optical transceiver module, thereby allowing the optical transceiver module to unplugged from the cage by pulling the key.

In another general aspect, the present invention relates to a method for locking and unlocking an optical transceiver module. The method includes inserting two fingers of a removable key into a cage in which the optical transceiver module is plugged; unlocking optical transceiver module from the cage; locking the key to the optical transceiver module; and pulling the key to unplug the optical transceiver module from the cage.

Implementations of the system may include one or more of the following. The key can include a locking mechanism to allow the key to be locked to the optical transceiver module. The locking mechanism can include a locking pin that is configured to be locked into a locking recess in the optical transceiver module. The key can include a releasing mechanism to allow the key to be disconnected from the optical transceiver module. The releasing mechanism can include a pivot block that is moved upward from a normal position to move the locking pin out of the locking recess. The key can include a spring configured to return the pivot block to the normal position after the locking pin is moved out of the locking recess. The optical transceiver module can include two tracks to receive the two fingers, wherein the two tracks are on two opposite surfaces of the optical transceiver module. The two figures can be substantially parallel to each other.

Embodiments may include one or more of the following advantages. The security of the optical communication is improved. The disclosed optical transceiver is locked into a cage during operation and can be unlocked only by a key specially designed for the optical transceiver. The key can be accessible to only authorized personnel. The key also include features that allow it to be easily carried by the authorized personnel. Another advantage of the disclosed system is that the optical transceiver can be simplified by removing the unlocking mechanism that is included in some conventional optical transceiver modules. Manufacturing complexity and cost for the optical transceiver are thus reduces.

DETAILED DESCRIPTION

Figure 1:
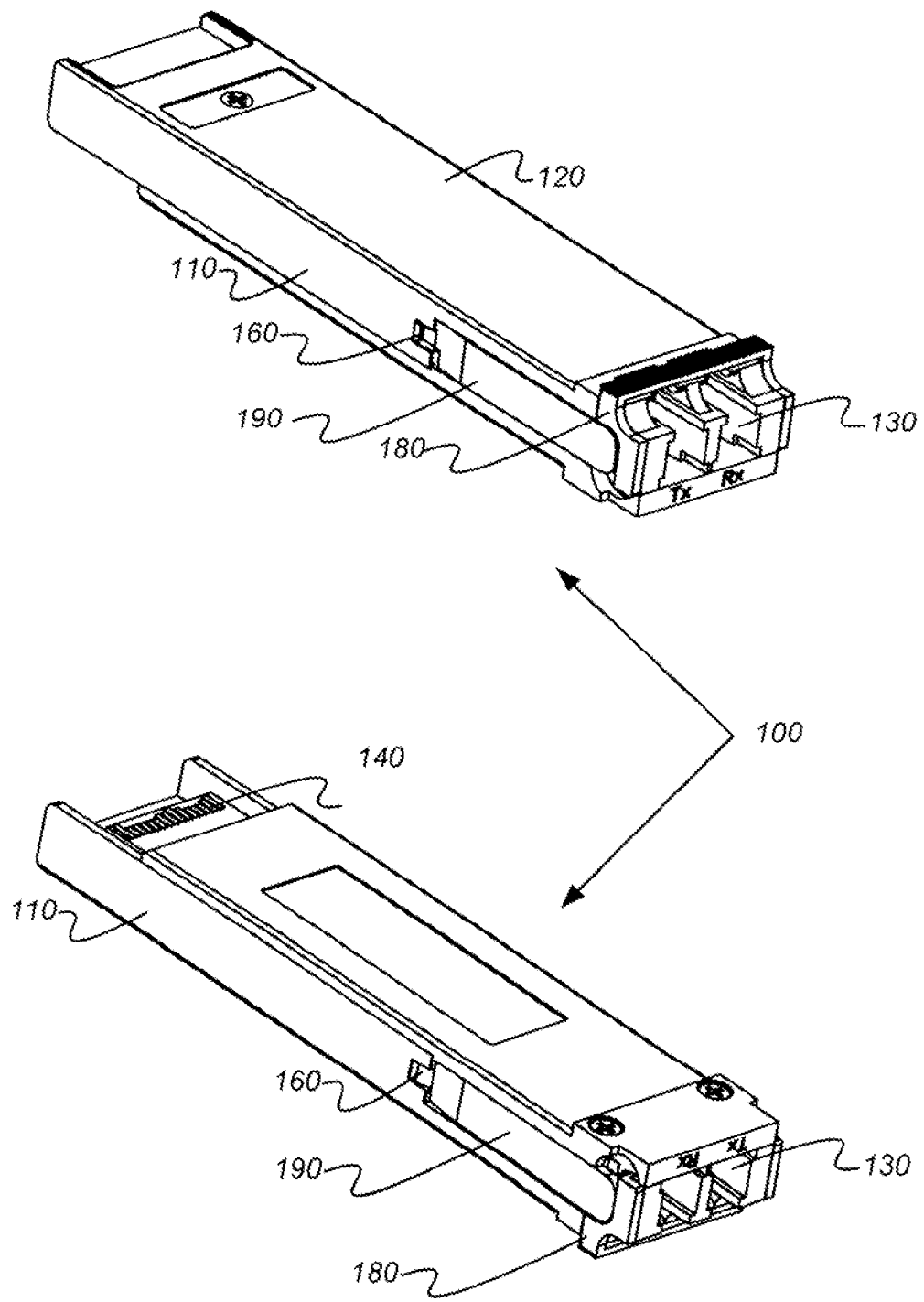
FIG. 1 is a perspective view of a conventional XFP optical transceiver module with a built-in unlocking mechanism.
Figure 2:
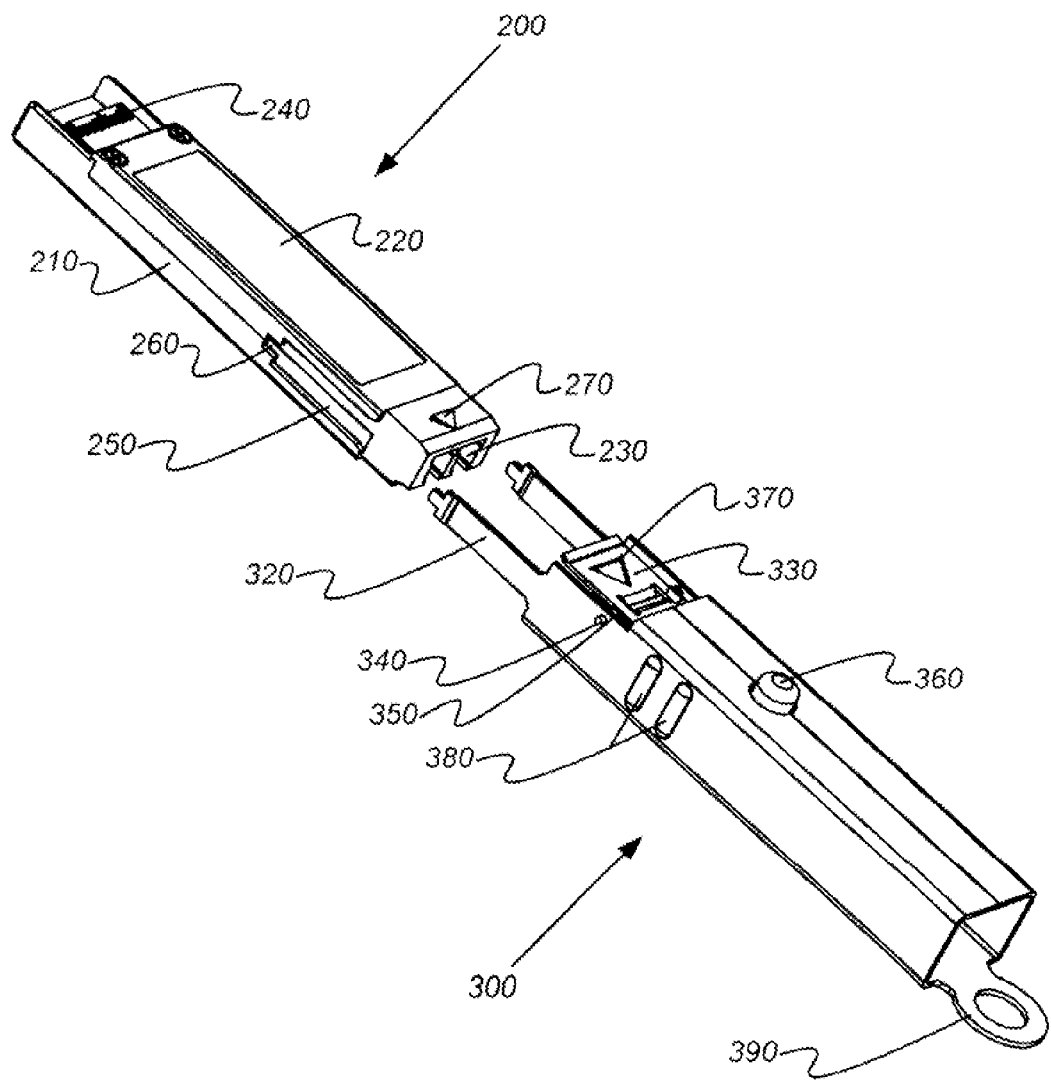
FIG. 2 is a perspective view of an optical transceiver and a key for unlocking the optical transceiver.
Figure 3:
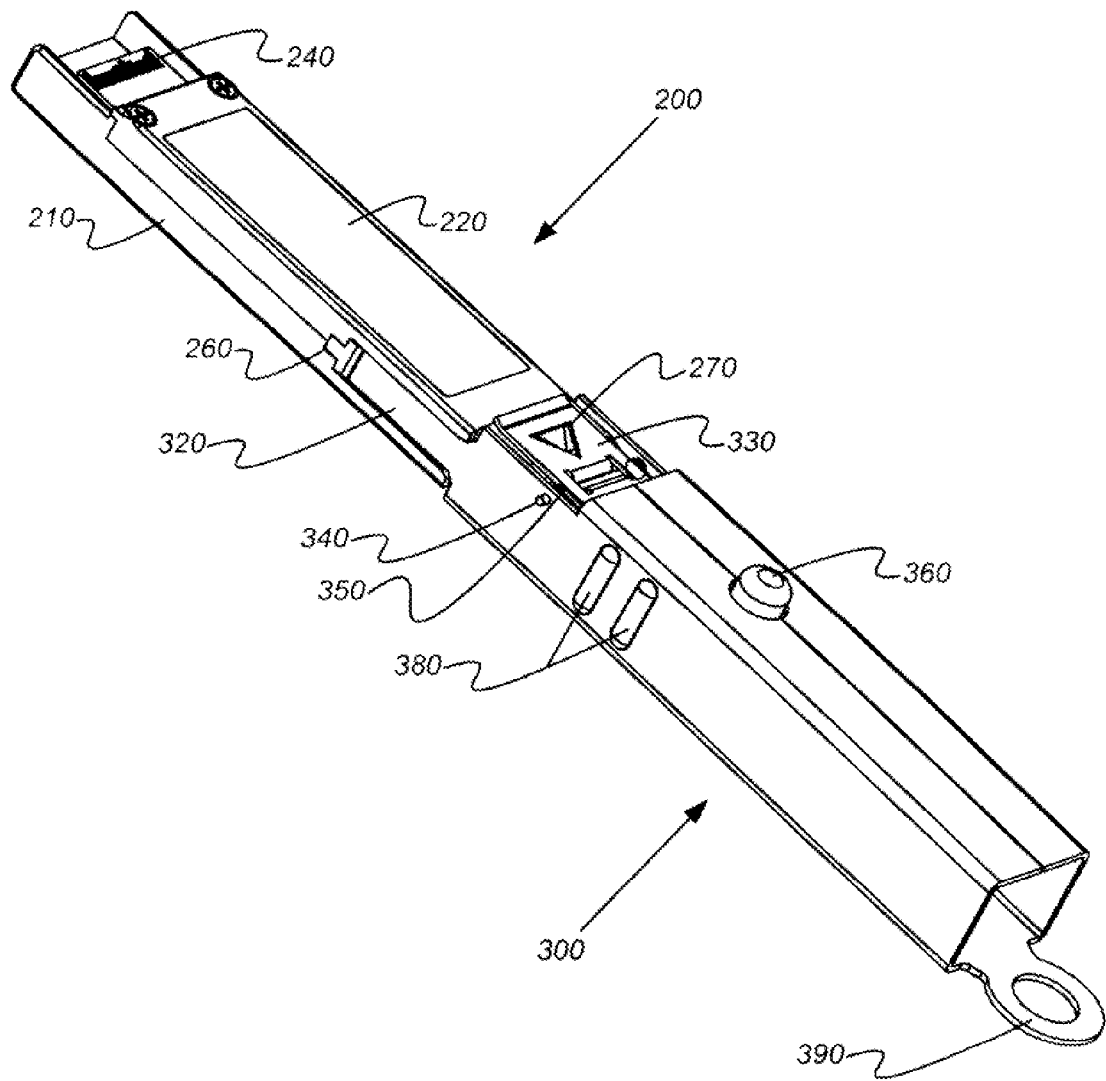
FIG. 3 is a perspective view of the optical transceiver of FIG. 2 and the key in a position that is locked to the optical transceiver.
Figure 4:
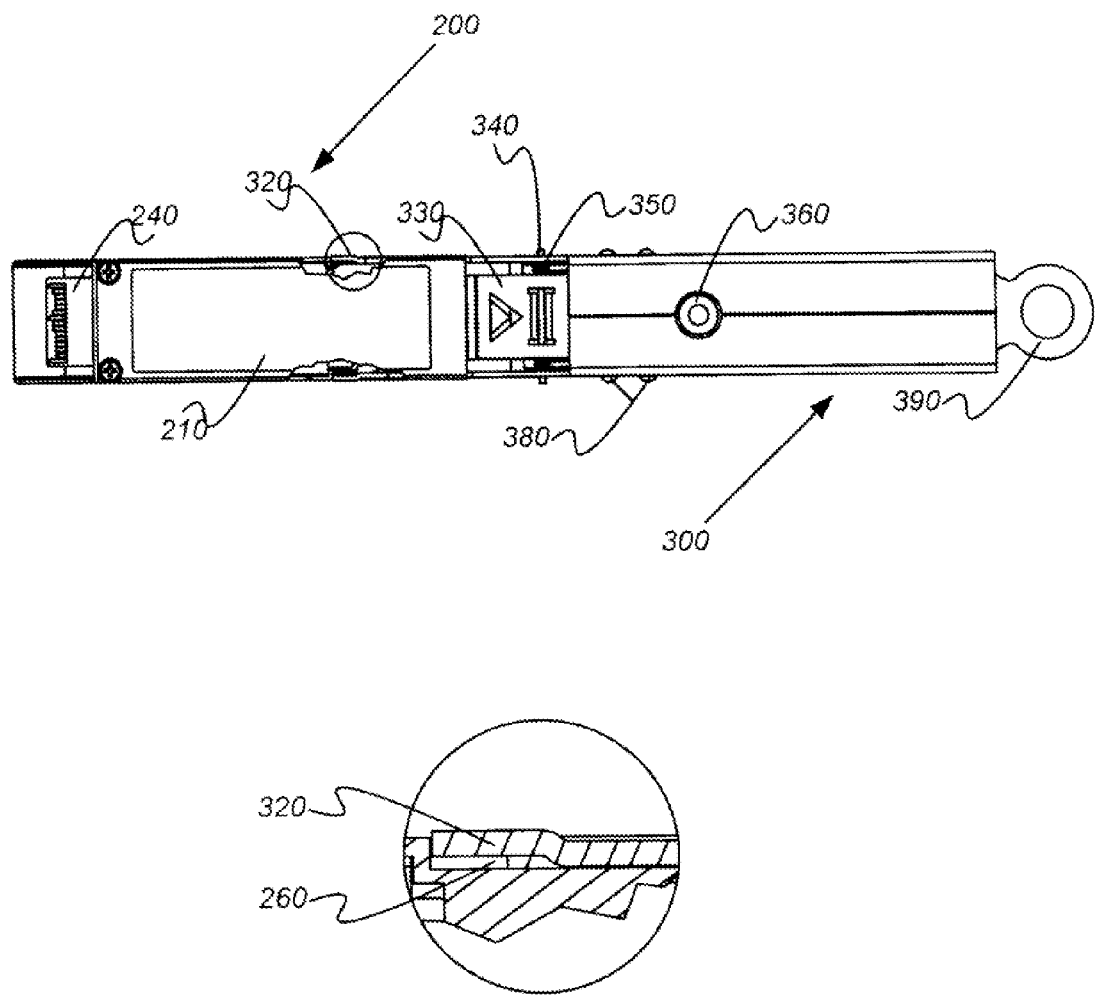
FIG. 4 is top view and an enlarged view of the optical transceiver and the key when the key is in a position locked to the optical transceiver.
Figure 5:
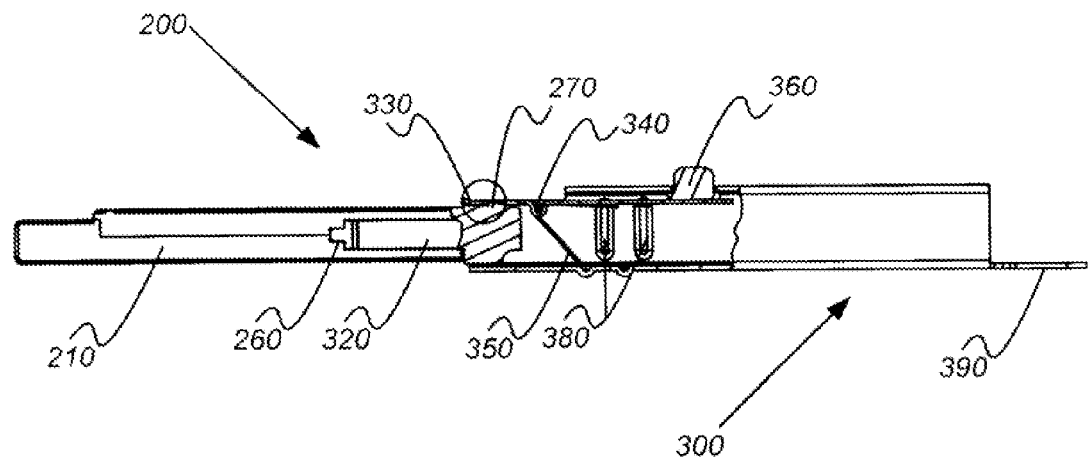
FIG. 5 is a side view and an enlarged view of the optical transceiver and the key when the key is in a position locked to the optical transceiver.
Figure 5:
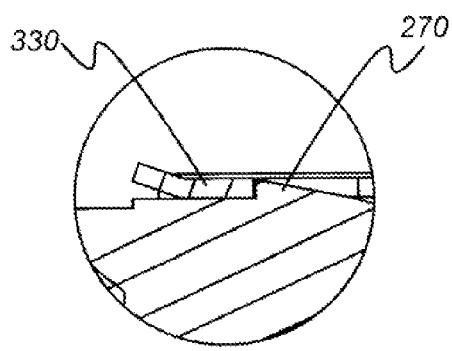

Referring to FIG. 2, an optical transceiver 200 is comprised of a base portion 210, a cover 220, an optical interface 230, an electrical interface 240, one or more tracks 250, two locking gaps 260 (one of the two gaps is on the other side of the optical transceiver 200 and is thus not visible in FIG. 2), and a lock pin 270. In contrary to a conventional optical transceiver module, the optical transceiver 200 does not include a built-in unlocking mechanism. A key 300 is provided to unlock the optical transceiver 200 from the cage. The key 300 includes unlocking fingers 320, a pivot block 330, a pivot arm 340, a spring 350, a press-button 360, a locking recess 370, a bulge 380, and a pothook 390. The optical transceiver 200 can be inserted into the cage and locked into the cage, when the pins in the cage are locked to the locking gaps 260. The optical transceiver 200 can be compatible with the XFP specifications.

To unlock the optical transceiver 200, the key 300 can be inserted into the case. The unlocking fingers 320 can be pushed along tracks 250 to push the pins in the cage outward, therefore releasing the locking of the optical transceiver 200 by the cage. At the same time, the lock pin 270 of the optical transceiver 200 can be locked to the locking recess 370 of the key 300 to connect the key 300 to the optical transceiver 200. Now that the optical transceiver 200 in unlocked from the cage and connected to the key 300, the optical transceiver 200 can be unplugged from the cage by pulling key 300.

Once the optical transceiver 200 is outside the cage, it can be disconnected from the key 300 by pressing the press-button 360. The pivot block 330 is moved upward, thus releasing the locking pin 270 of the optical transceiver 200 from the locking recess 370 of the key 300. The pivot block 330 returns to its normal state by the spring 350 once the press button 360 is released, making the key 300 ready for the next unlocking operation.

Details about the optical transceiver are disclosed in commonly assigned U.S. patent application Ser. No. 10/741,805, titled "Bi-directional optical transceiver module having automatic-restoring unlocking mechanism", filed on Dec. 19, 2003, U.S. patent application Ser. No. 10/815,326, titled "Small form factor pluggable optical transceiver module having automatic-restoring unlocking mechanism and mechanism for locating optical transceiver components", filed on Apr. 1, 2003, and U.S. patent application Ser. No. 10/850,216, titled "Optical Transceiver module having improved printed circuit board", filed on May 20, 2004. The disclosures of these related applications are incorporated herein by reference.

One advantage of the disclosed system is improvement of security when an optical transceiver is used in operation. The disclosed key can be accessible to only authorized personnel. The optical transceiver can thus not be easily removed. The security of the optical transceiver during operation is thus improved. Another advantage of the disclosed system is that a lock pin is provided to lock the key with the optical transceiver. Yet another advantage of the disclosed system is that the optical transceiver can be simplified by removing the unlocking mechanism in some conventional optical transceiver modules.

It is understood that disclosed key and the transceiver module may be suitable for different optical transceiver standards such as the XFP format. The disclosed system can be compatible with different configurations for the key and the optical transceiver as well as different methods of locking and unlocking the optical transceiver in and out of the cage.

What is claimed is:

1. An optical transceiver system, comprising:
   an optical transceiver module configured to be locked to cage in a host electronic equipment and comprising two external tracks respectively formed on two opposite external side walls of the optical transceiver module; and
   a key configured to remove the optical transceiver module from the cage, wherein the key comprises two fingers configured to be inserted into the cage to fit into the two external tracks of the optical transceiver module and to unlock the optical transceiver module from the cage.

2. The optical transceiver system of claim 1, wherein the key comprises a locking mechanism to allow the key to be locked to the optical transceiver module.

3. The optical transceiver system of claim 2, wherein the locking mechanism comprises a locking pin that is configured to be locked into a locking recess in the optical transceiver module.

4. The optical transceiver system of claim 3, wherein the key comprises a releasing mechanism to allow the key to be disconnected from the optical transceiver module.

5. An optical transceiver system, comprising:
   an optical transceiver module configured to be locked to cage in a host electronic equipment; and
   a key configured to remove the optical transceiver module from the cage, wherein the key comprises (1) a locking mechanism which comprises a locking pin that is configured to be locked into a locking recess in the optical transceiver module to allow the key to be locked to the optical transceiver module, (2) a releasing mechanism to allow the key to be disconnected from the optical transceiver module, and (3) two fingers configured to be inserted into the cage and to unlock the optical transceiver module from the cage,
   wherein the releasing mechanism includes a pivot block that is moved upward from a normal position to move the locking pin out of the locking recess.

6. The optical transceiver system of claim 5, wherein the key comprises a spring configured to return the pivot block to the normal position after the locking pin is moved out of the locking recess.

7. The optical transceiver system of claim 1, wherein the optical transceiver module comprises two tracks to receive the two fingers, wherein the two tracks are on two opposite surfaces of the optical transceiver module.

8. The optical transceiver system of claim 1, wherein the two figures are substantially parallel to each other.

9. A removable key for an optical transceiver module, comprising:
   two fingers configured to be inserted into a cage in which the optical transceiver module is plugged, wherein the two fingers are configured to fit into two external tracks respectively formed on two opposite external side walls of the optical transceiver module and to unlock the optical transceiver module from the cage; and
   a locking mechanism to allow the key to be locked to the optical transceiver module, thereby allowing the optical transceiver module to unplugged from the cage by pulling the key.

10. The removable key of claim 9, wherein the locking mechanism comprises a locking pin that is configured to be locked into a locking recess in the optical transceiver module.

11. The removable key of claim 10, wherein the key comprises a releasing mechanism to allow the key to be disconnected from the optical transceiver module.

12. A removable key for an optical transceiver module, comprising:
   two fingers configured to be inserted into a cage in which the optical transceiver module is plugged, wherein the two fingers are configured to unlock the optical transceiver module from the cage;
   a locking mechanism to allow the key to be locked to the optical transceiver module, thereby allowing the optical transceiver module to unplugged from the cage by pulling the key, the locking mechanism comprising a locking pin that is configured to be locked into a locking recess in the optical transceiver module; and
   a releasing mechanism to allow the key to be disconnected from the optical transceiver module, wherein the releasing mechanism includes a pivot block that is moved upward from a normal position to move the locking pin out of the locking recess.

13. The removable key of claim 12, further comprising a spring configured to return the pivot block to the normal position after the locking pin is moved out of the locking recess.

14. The removable key of claim 9, wherein the two figures are substantially parallel to each other.

15. A method for locking and unlocking an optical transceiver module, comprising:
   inserting two fingers of a removable key into a cage in which the optical transceiver module is plugged;
   unlocking optical transceiver module from the cage;
   locking the key to the optical transceiver module by locking a locking pin into a locking recess in the optical transceiver module;
   releasing the key from the optical transceiver module, the releasing comprising moving the locking pin out of the locking recess by moving a pivot block; and
   pulling the key to unplug the optical transceiver module from the cage.

16. The method of claim 15, wherein the step of unlocking comprises pressing two pins outward by the two fingers.

17. The method of claim 15, wherein the two figures are substantially parallel to each other.

\* \* \* \* \*